(12) United States Patent
Breed

(10) Patent No.: US 8,047,432 B2
(45) Date of Patent: Nov. 1, 2011

(54) PACKAGE TRACKING TECHNIQUES

(75) Inventor: David S. Breed, Miami Beach, FL (US)

(73) Assignee: Intelligent Technologies International, Inc., Denville, NJ (US)

( * ) Notice: Subject to any disclaimer, the term of this patent is extended or adjusted under 35 U.S.C. 154(b) by 565 days.

(21) Appl. No.: 11/877,213

(22) Filed: Oct. 23, 2007

(65) Prior Publication Data

US 2008/0262646 A1 Oct. 23, 2008

Related U.S. Application Data

(63) Continuation-in-part of application No. 10/940,881, filed on Sep. 13, 2004, now Pat. No. 7,663,502, which is a continuation-in-part of application No. 10/457,238, filed on Jun. 9, 2003, now Pat. No. 6,919,803, said application No. 10/940,881 is a continuation-in-part of application No. 10/931,288, filed on Aug. 31, 2004, now Pat. No. 7,164,117, application No. 11/877,213, and a continuation-in-part of application No. 11/380,574, filed on Apr. 27, 2006, which is a continuation-in-part of application No. 11/278,979, filed on Apr. 7, 2006, now Pat. No. 7,386,372, which is a continuation-in-part of application No. 10/931,288, application No. 11/877,213, and a continuation-in-part of application No. 11/619,863, filed on Jan. 4, 2007, which is a continuation-in-part of application No. 11/420,297, filed on May 25, 2006, now Pat. No. 7,330,784, which is a continuation-in-part of application No. 10/931,288, filed on Aug. 31, 2004, application No. 11/877,213, and a continuation-in-part of application No. 11/865,363, filed on Oct. 1, 2007, now Pat. No. 7,819,003, and a continuation-in-part of application No. 11/843,932, filed on Aug. 23, 2007, which is a continuation-in-part of application No. 11/755,199, filed on May 30, 2007.

(60) Provisional application No. 60/387,792, filed on Jun. 11, 2002.

(51) Int. Cl.
*G07B 15/02* (2006.01)

(52) U.S. Cl. ...................................... 235/384; 235/385

(58) Field of Classification Search .................. 235/384, 235/385, 454, 462.01
See application file for complete search history.

(56) References Cited

U.S. PATENT DOCUMENTS

| | | | | |
|---|---|---|---|---|
| 4,750,197 A | * | 6/1988 | Denekamp et al. | 455/404.2 |
| 5,903,226 A | * | 5/1999 | Suman et al. | 340/825.69 |
| 5,969,595 A | * | 10/1999 | Schipper et al. | 340/426.19 |
| 6,064,416 A | * | 5/2000 | Esch et al. | 347/225 |
| 6,236,911 B1 | * | 5/2001 | Kruger | 701/1 |
| 6,437,702 B1 | * | 8/2002 | Ragland et al. | 340/686.1 |
| 6,631,842 B1 | * | 10/2003 | Tsikos et al. | 235/454 |

\* cited by examiner

*Primary Examiner* — Daniel Hess
(74) *Attorney, Agent, or Firm* — Brian Roffe

(57) ABSTRACT

Method and system for tracking packages including readable indicia in a movable cargo container includes mounting at least one scanner to an interior surface of the container capable of reading the indicia on, in or associated with the packages, operatively reading the indicia from the packages, converting the read indicia into an identification of the packages, and transmitting the package identifications to a remote facility. Each scanner may be controlled to read the indicia at predetermined times, upon command from the remote facility or upon detection of an event which could result in a change in the contents of the container. A positioning system may be arranged on the container to determine its location and the location of the container transmitted with the package identifications. This provides an entity managing the delivery or transport of the packages with an efficient way to track its package in real-time.

24 Claims, 7 Drawing Sheets

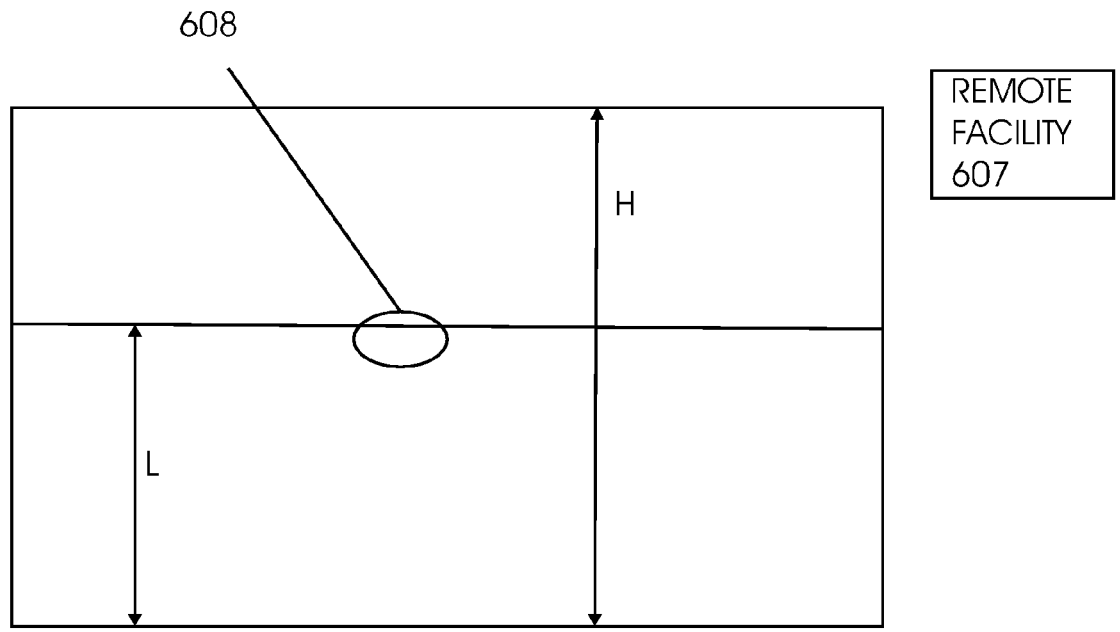
Fig. 10
Fig. 11
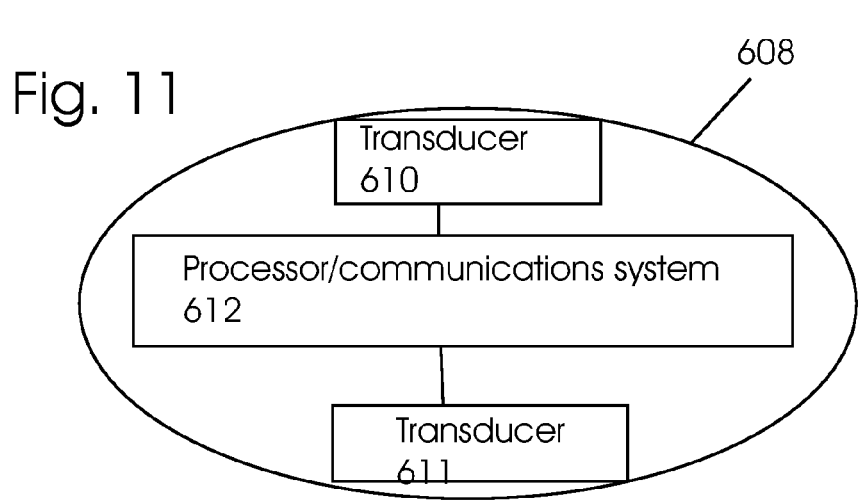

PACKAGE TRACKING TECHNIQUES

CROSS REFERENCE TO RELATED APPLICATIONS

This application is:
1. a continuation-in-part (CIP) of U.S. patent application Ser. No. 10/940,881 filed Sep. 13, 2004, now U.S. Pat. No. 7,663,502, which is:
   A. a CIP of U.S. patent application Ser. No. 10/457,238 filed Jun. 9, 2003, now U.S. Pat. No. 6,919,803 which claims priority under 35 U.S.C. §119(e) of U.S. provisional patent application Ser. No. 60/387,792 filed Jun. 11, 2002; and
   B. a CIP of U.S. patent application Ser. No. 10/931,288 filed Aug. 31, 2004, now U.S. Pat. No. 7,164,117;
2. a CIP of U.S. patent application Ser. No. 11/278,979 filed Apr. 7, 2006, now U.S. Pat. No. 7,386,372;
3. a CIP of U.S. patent application Ser. No. 11/380,574 filed Apr. 27, 2006 which is a CIP of U.S. patent application Ser. No. 10/931,288 filed Aug. 31, 2004, now U.S. Pat. No. 7,164,117;
4. a CIP of U.S. patent application Ser. No. 11/619,863 filed Jan. 4, 2007 which is a CIP of U.S. patent application Ser. No. 10/931,288 filed Aug. 31, 2004, now U.S. Pat. No. 7,164,117;
5. a CIP of U.S. patent application Ser. No.11/755,199 filed May 30, 2007;
6. a CIP of U.S. patent application Ser. No. 11/843,932 filed Aug. 23, 2007; and
7. a CIP of U.S. patent application Ser. No. 11/865,363 filed Oct. 1, 2007.

This application is related to U.S. patent application Ser. No. 11/416,475 filed May 1, 2006 on the grounds that they include common subject matter.

All of the above-referenced applications are incorporated by reference herein.

FIELD OF THE INVENTION

The present invention relates to methods and systems for tracking packages in movable assets, such as cargo containers.

BACKGROUND OF THE INVENTION

A detailed discussion of background information is set forth in parent applications listed above and incorporated by reference herein. All of the patents, patent applications, technical papers and other references referenced below and in the parent applications are incorporated herein by reference in their entirety. Various patents, patent applications, patent publications and other published documents are discussed below as background of the invention. No admission is made that any or all of these references are prior art and indeed, it is contemplated that they may not be available as prior art when interpreting 35 U.S.C. §102 in consideration of the claims of the present application.

OBJECTS AND SUMMARY OF THE INVENTION

It is an object of the present invention to provide new and improved techniques for tracking packages in a movable cargo container.

In order to achieve this object and others, a method for tracking packages in a movable cargo container in accordance with the invention includes mounting at least one scanner to an interior surface of the container capable of reading indicia on, in or otherwise associated with the packages, operatively reading the indicia from the packages, converting the read indicia into an identification of the packages, and transmitting the package identifications to a remote facility. Each scanner may be controlled to read the indicia at predetermined times, upon command from the remote facility or upon detection of an event which could result in a change in the contents of the container. A positioning system may be arranged on the container to determine its location and the location of the container transmitted with the package identifications. This provides an entity managing the delivery or transport of the packages with an efficient way to track its packages in real-time.

The scanner may be an optical scanner arranged to read barcodes on the packages or when the indicia is an RFID tag, the scanner may be an interrogator arranged to generate a radio frequency signal which is transmitted into the interior of the container such that RFID tags on the packages provide a responsive signal which is detected by the interrogator and converted into an identification of the package.

A system for tracking packages including readable indicia in a movable cargo container in accordance with the invention includes one or more scanners mounted to an interior surface of the container capable of reading the indicia on, in or otherwise associated with the packages and each arranged to operatively read the indicia from the packages and convert the read indicia into an identification of the packages, and a communications system coupled to the optical scanner(s) for transmitting the package identifications to a remote facility. Instead of each scanner converting the indicia into package identification, a single processor may be provided for multiple scanners.

When a plurality of optical scanners is provided, preferably, their cumulative field of view encompasses the entire interior of the container. A system for moving one or more of the optical scanners along the length of the container may be provided to vary its field of view and thereby aid in ensuring that the entire interior of the container can be scanned.

An exemplifying optical scanner includes single light beam emitter and a plurality of light receivers arranged at different locations.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims. In particular, the illustrations below are frequently limited to the monitoring of the front passenger seat for the purpose of describing the system. The invention applies as well to adapting the system to the other seating positions in the vehicle and particularly to the driver and rear passenger positions.

FIG. 10 is a cross-sectional view of an embodiment of a fluid level measuring system in accordance with the invention.

FIG. 11 is an enlarged view of the fluid level measuring system shown in FIG. 10.

DETAILED DESCRIPTION OF THE INVENTION

Figure 1:
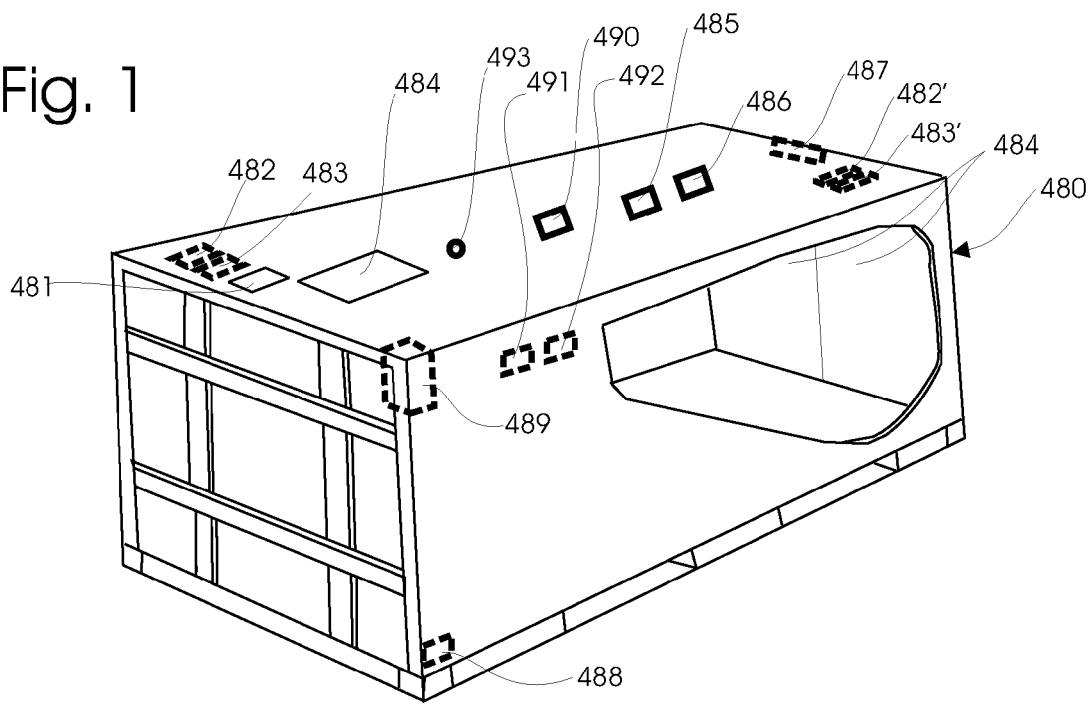
FIG. 1 is a perspective view showing a shipping container including one embodiment of the monitoring system in accordance with the present invention.

Whenever a patent or literature is referred to below, it is to be assumed that all of that patent or literature is to be incorporated by reference in its entirety to the extent the disclosure of this reference is necessary. Also note that although many of the examples below relate to a particular vehicle, an automobile, the invention is not limited to any particular vehicle and is thus applicable to all relevant vehicles including shipping containers, fixed or movable storage tanks and truck trailers and to all compartments of a vehicle including, for example, the passenger compartment and the trunk of an automobile or truck.

Prior to describing the invention in detail, definitions of certain words or phrases used throughout this patent document will be defined: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

1. Telematics

Some of the inventions herein relate generally to telematics and the transmission of information from a vehicle to one or more remote sites which can react to the position or status of the vehicle and/or occupant(s) or contents therein.

Initially, sensing of the occupancy of the vehicle and the optional transmission of this information, which may include images, to remote locations will be discussed. This entails obtaining information from various sensors about the occupants in the passenger compartment of the vehicle, for example, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

The use of telematics is included with a discussion of general vehicle diagnostic methods with the diagnosis being transmittable via a communications device to the remote locations is discussed in the parent '363 application. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations. Many transmission modes exist including cellular phone systems, satellite communications and the Internet. The Internet systems can be broken into two types, those that are available only at particular "hot-spots" and the use of ubiquitous internet. The use of ubiquitous internet is believed to be unique to the inventions herein as the inventors may have been the first to recognize that ubiquitous internet would become available and can be counted on to provide the sole system for communication from various vehicles including automobiles, trucks and truck trailers, storage tanks and shipping containers replacing all other communication systems. Their vision is now being realized through such systems as WiMAX.

1.1 Transmission of Occupancy Information

Figure 2:
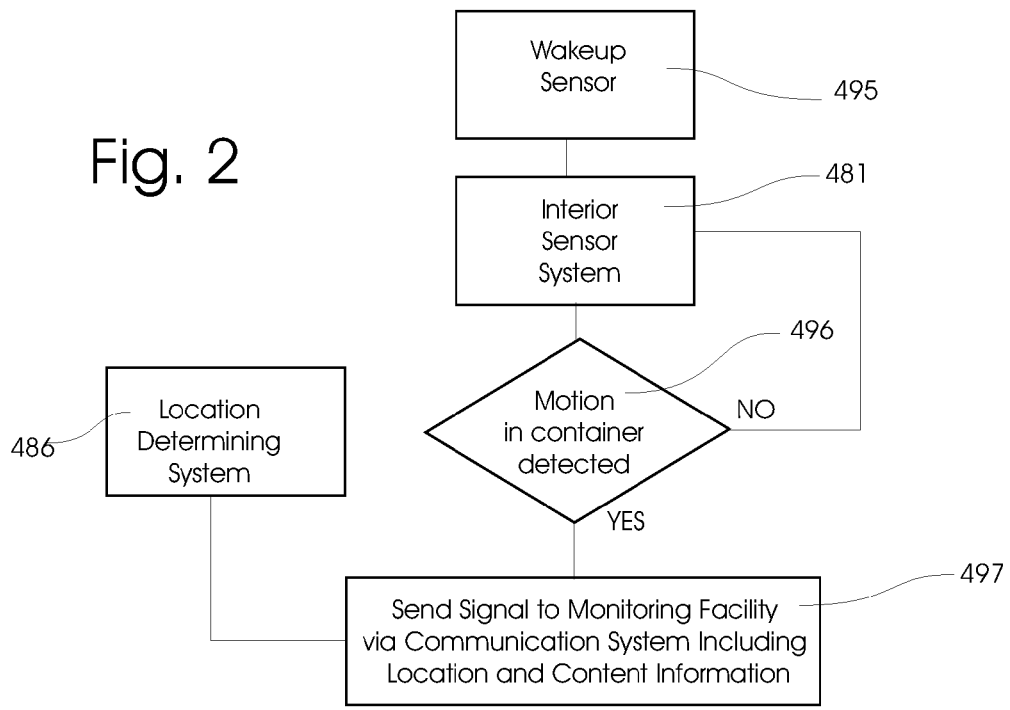
FIG. 2 is a flow chart showing one manner in which a container is monitored in accordance with the invention.

The cellular phone system, ubiquitous internet, or other telematics communication device, is shown schematically in FIG. 2 of the parent '363 application and outputs to an antenna. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

In relation to this aspect, see the discussion above of the schematic shown in FIG. 61 of the parent '363 application.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

Figure 5:
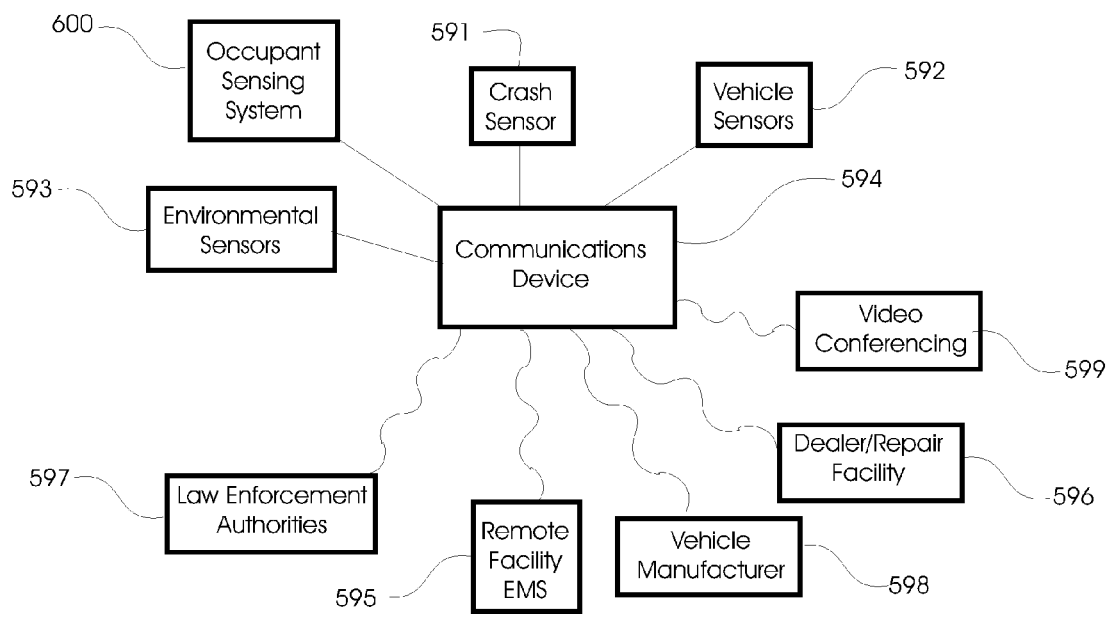
FIG. 5 is a schematic view of overall telematics system in accordance with the invention.

FIG. 5 shows a schematic of the integration of the occupant sensing with a telematics link and the vehicle diagnosis with a telematics link. As envisioned, the occupant sensing system 600 includes those components which determine the presence, position, health state, and other information relating to the occupants, for example the transducers discussed with reference to FIGS. 1, 2 and 61 of the parent '363 application and the SAW device discussed with reference to FIG. 62 of the '363 application. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in the current assignee's patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 136-141 of the '881 application. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed herein can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle. The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 5, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet. It can also be directly to a ubiquitous internet system such as WiMAX.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

1.2 Low Cost Automatic Crash Notification

A system for notifying remote personnel, e.g., emergency response personnel, of an accident is described herein.

Using the any of the various communication systems described above, an automatic crash notification system can be built. The crash can be sensed by the airbag crash or rollover sensors or the deployment of the airbag event can be sensed to trigger the communication of the event. The system can be powered by the vehicle power or a battery can be used that has a very long life since the system would draw little current until the event. An advantage of a self-powered system is that it can be more easily retrofitted to existing vehicles. Additionally, a self-powered system would still operate on the loss of vehicle power which can happen during a crash. A small energy harvesting unit based on vibrations or light can be incorporated to overcome battery loss due to leakage and maintain the battery in a charged state for the life of the vehicle. This self-contained system can use a microphone, for example, to sense airbag deployment and thus the only wiring required would be to the communication system which also could be contained within the unit. In some cases, the unit can be on the vehicle safety bus where it could derive both power and crash information. In this latter case, a backup power supply in the form of a capacitor can be provided. The communication system can be any of those mentioned above including a satellite based system such as provided by SkyBitz, Inc., the cellular phone system or, preferably, a ubiquitous internet system such as WiMAX. Such a ubiquitous system is not yet in service but the inventors believe that the arguments for such a system are overwhelming and thus it will occur probably in time for the deployment of a universal automatic crash notification system as described herein.

Any or all of the information obtained from occupancy and other onboard sensors can be part of the information sent to the remote location via the communication or telematics system.

1.3 Cell Phone Improvements

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of driver's mouth varies significantly depending on such things as the size and seating position of the driver. By using the vehicle interior identification and monitoring system of at least one of the inventions disclosed herein, and through appropriate pattern recognition techniques, the location of the driver's head can be determined with sufficient accuracy even with ultrasonics to permit a directional microphone assembly to be sensitized to the direction of the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 40 of the parent '363 application, which is a system similar to that of FIG. 2 only using three ultrasonic transducers to determine the location of the driver's head and control the pointing direction of a microphone. Speaker is shown connected schematically to the phone system 34 completing the system.

One transducer can be placed high in the A-pillar, another transducer on the headliner and yet another transducer on the IP. Other locations are possible as discussed above. The three transducers are placed high in the vehicle passenger compartment so that the first returned signal is from the head. Temporal filtering is used to eliminate signals that are reflections from beyond the head and the determination of the head center location is then found by the approximate centroid of the head-returned signal. That is, once the location of the return signal centroid is found from the three received signals from transducers, the distance to that point is known for each of the transducers based on the time it takes the signal to travel from the head to each transducer. In this manner, by using the three transducers, all of which send and receive, plus an algorithm for finding the coordinates of the head center, using a processor, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise. Camera-based systems can be used to more accurately locate parts of the body such as the head.

The placement of multiple imagers in the vehicle, the use of a plastic electronics-based display plus telematics permits the occupants of the vehicle to engage in a video conference if desired. Until autonomous vehicles appear, it would be best if the driver did not participate.

1.4 Telematics with Non-Automotive Vehicles

The transmission of data obtained from imagers, or other transducers, to another location, requiring the processing of the information, using neural networks for example, to a remote location is an important feature of some of the inventions disclosed herein. This capability can permit an owner of a cargo container, storage tank or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein. The implementation of a ubiquitous internet service would greatly facilitate this type of container tracking through the infrastructure and information transfer into appropriate databases.

An alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device would only operate on a low duty cycle, the battery should last for many days or perhaps longer. Of course, if it is connected to the vehicle power system, or to an energy harvesting system, its life could be indefinite. When power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. No. 5,809,437, 6,175,787 and 6,326,704 can also be used in the invention.

1.5 Telematics for Storage Tanks

What follows in a discussion of remote monitoring the level of a fluid in a storage tank or container as well as other properties of a tank, its environment and its contents. The determination of the level of a fluid in a tank has been the subject of many patents, books and other published articles and papers (see, for example, Measurement and Control of Liquid Level (An Independent learning module from the Instrument Society of America) by Chun H. Cho, which describes several such methods). A combination of any of these methods with a low power consumption, long life telematics system permitting the remote monitoring of a fixed or movable storage tank and its contents and environment over long periods of time without intervention is not believed to be available. With the availability of the system described herein, storage tanks or other fluid storage structures or housings placed anywhere in the world can be monitored from any other place in the world for fluid level, tampering, theft of contents or the entire tank, fire, excessive temperature, usage, etc. without maintenance for several years.

Figure 6:
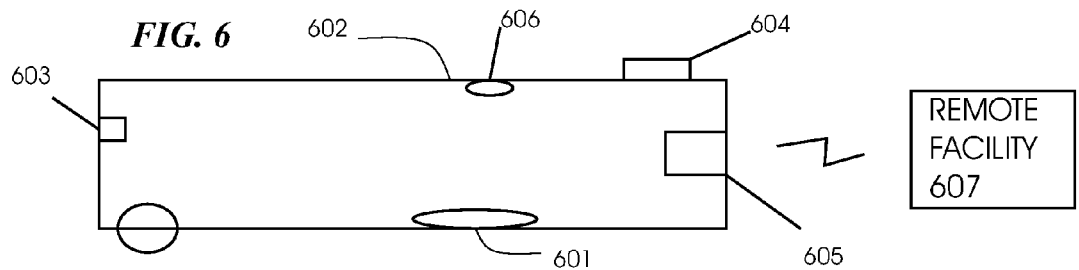
FIG. 6 is a schematic side view of a movable storage tank, commonly known as a Frac tank, containing a level monitoring system in accordance with the invention.
Figure 7:
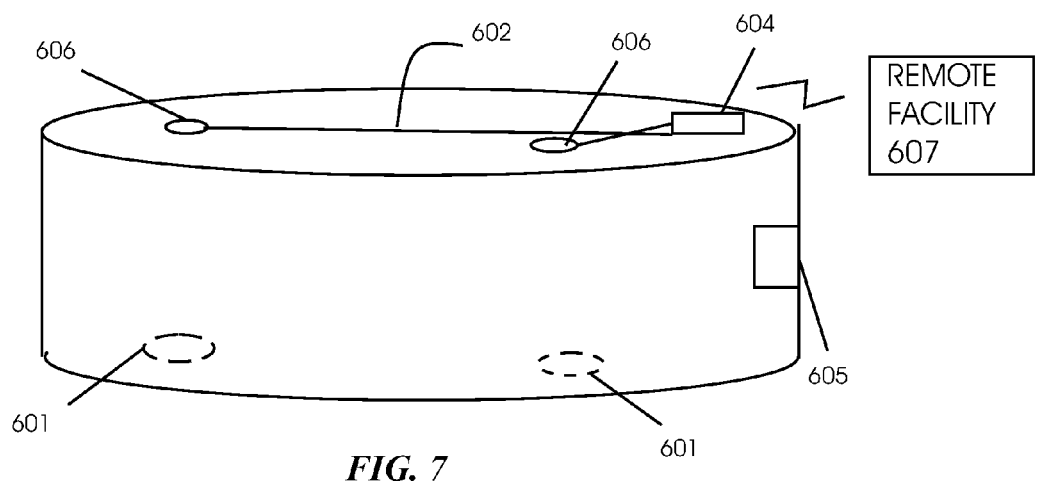
FIG. 7 is a perspective view of an oil or chemical storage tank containing a level monitoring system in accordance with the invention.

FIG. 6 is a side view of a Frac tank, such as supplied by e-Tank Inc, of Massillon, Ohio, containing a level monitoring system and other sensors in accordance with the invention. FIG. 7 is a perspective view of an oil or chemical storage tank containing a level monitoring system in accordance with the invention.

One preferred implementation of such a system for use with the Frac tank a schematically shown in FIG. 6 and the storage tank as schematically shown in FIG. 7 is described with reference to FIGS. 8 and 9. In a most basic embodiment, an interior sensor system is arranged on a housing of the storage tank or other fluid-storage structure and is arranged to obtain information about any fluid in the interior of the housing, this information being the presence of fluid in the tank and/or the level of fluid in the tank. A location determining system is also arranged on the housing and monitors the location of the tank, i.e., either is provided with an initial position and monitors change in that position or is provided with a device to enable it to determine it position. A communication system is coupled to the interior sensor system and the location determining system, and possibly even arranged on the housing itself, and transmits the information about the fluid in the interior of the housing and the location of the tank to a remote facility. The remote facility may be any facility which monitors the contents of the tank, including possibly multiple facilities, all of which are concerned with the contents and condition of the tank or the fluid therein. Instead of being mounted on the housing itself, the communication system may be arranged in close proximity to the housing and coupled to the interior sensor system and location determining system via wires or in a wireless manner.

The level measurement in this example is accomplished using one or more wave-receiving devices 606, such as an ultrasonic transducer manufactured by Murata and described in the '572 patent mentioned above, and a reference target 601, which may donut-shaped. Each wave-receiving device 606 directs waves at an upper surface of the fluid when present in the interior of the tank, when it is a wave transmitter, or alternatively receives waves, e.g., electromagnetic waves, from the fluid when it is, for example, an optical imager. Preferably, each wave receiving device 606 is sealed into an enclosure which prevents it from being damaged by the fluid, i.e., liquid or gas in the interior of the housing of the tank, Each wave-receiving device 606 can be mounted to or in the top wall 602 on the inside of any of the above mentioned tanks such that its operative field of view extends downward toward the fluid in the tank, whether downward toward the bottom of the tank or at an angle to a side of the tank. A control unit/processor is provided to control the manner in which each wave-receiving device 606 emits ultrasonic pulses, and the control unit/processor is shown schematically as 604, which unit also includes a location determining system as described above. The location determining system and control unit/processor may be arranged apart from one another, and possibly alongside the housing of the tank or on another face of the tank, e.g., a side of the tank.

When the wave-receiving device 606 is an ultrasonic transducer, e.g., an ultrasonic wave transmitter/receiver, each time the wave-receiving device 606 emits an ultrasonic pulse, a reflection is obtained from the fluid surface and also from the reference target 601. The received reflections are analyzed by the control unit/processor 604. In one embodiment, the control unit/processor 604 is provided with information about the distance between the wave-receiving device 606 and the reference target 601 in its field of view. In this case, since the location of the reference target 601 relative to the wave-receiving device 606 and the speed of sound in the tank can be calculated, the effects of temperature and gas chemical makeup can be determined. A ratio of the echo times from the reference target 601 and fluid enables the control unit/processor 604 coupled to the wave-receiving device 606 to determine the location of the fluid surface. Knowing also the dimensions of the tank, the control unit/processor 604 can also determine the quantity of fluid in the tank. A key advantage therefore of this system is that it is independent of gas composition and temperature. Additional reference targets can of course be added if it is desired to take into account the effects in gradation in the speed of sound caused by either the temperature or gas composition. This system of course only measures the fluid level at one location, the location impacted by the transmitted ultrasonic waves, and thus some method of determining the rotations about the horizontal axes of the tank may also be incorporated, at least for tanks that are movable such as the Frac tank shown in FIG. 6. One method is to use multiple systems of the type described herein (noting multiple wave-receiving devices 606 in FIG. 7) or the incorporation of one or more tilt sensors 603 shown in FIG. 6, such as those manufactured by Fredriks of Huntingdon, Pa. and described in the '572 patent. If the geometry of the tank is known and the level of the fluid is measured at one appropriate point, then with the added information from a tilt or angle sensor 603, the quantity of the fluid in the tank can be accurately determined. Indeed, it has been established that by using trained pattern recognition techniques, knowing only three parameters about a fluid tank, it is possible to operatively and accurately determine the quantity of fluid in the tank, even when the tank is subject to inclination. This is discussed in U.S. Pat. No. 6,892,572, incorporated by reference herein. Other more accurate angle gages are available as can be determined by one with ordinary skill in the art and the Fredriks sensors discussed herein are for illustration purposed only.

Figure 8:
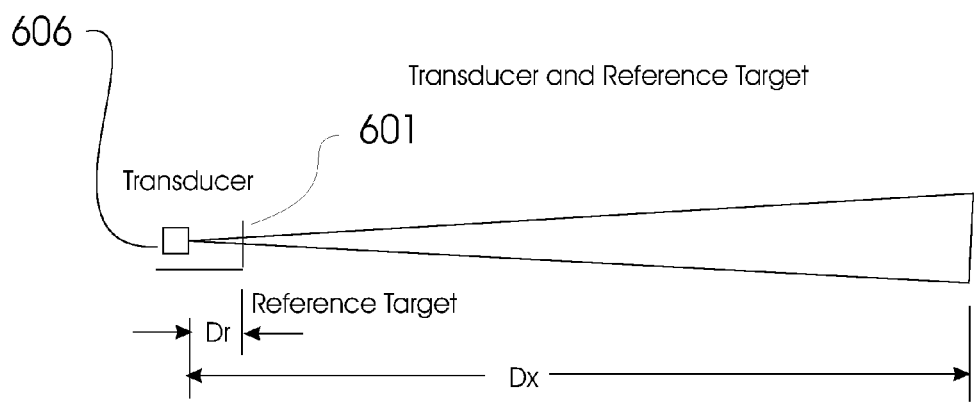
FIG. 8 shows one preferred method of determining the level of a fluid in a tank that is independent on temperature or the speed of sound.
Figure 9:
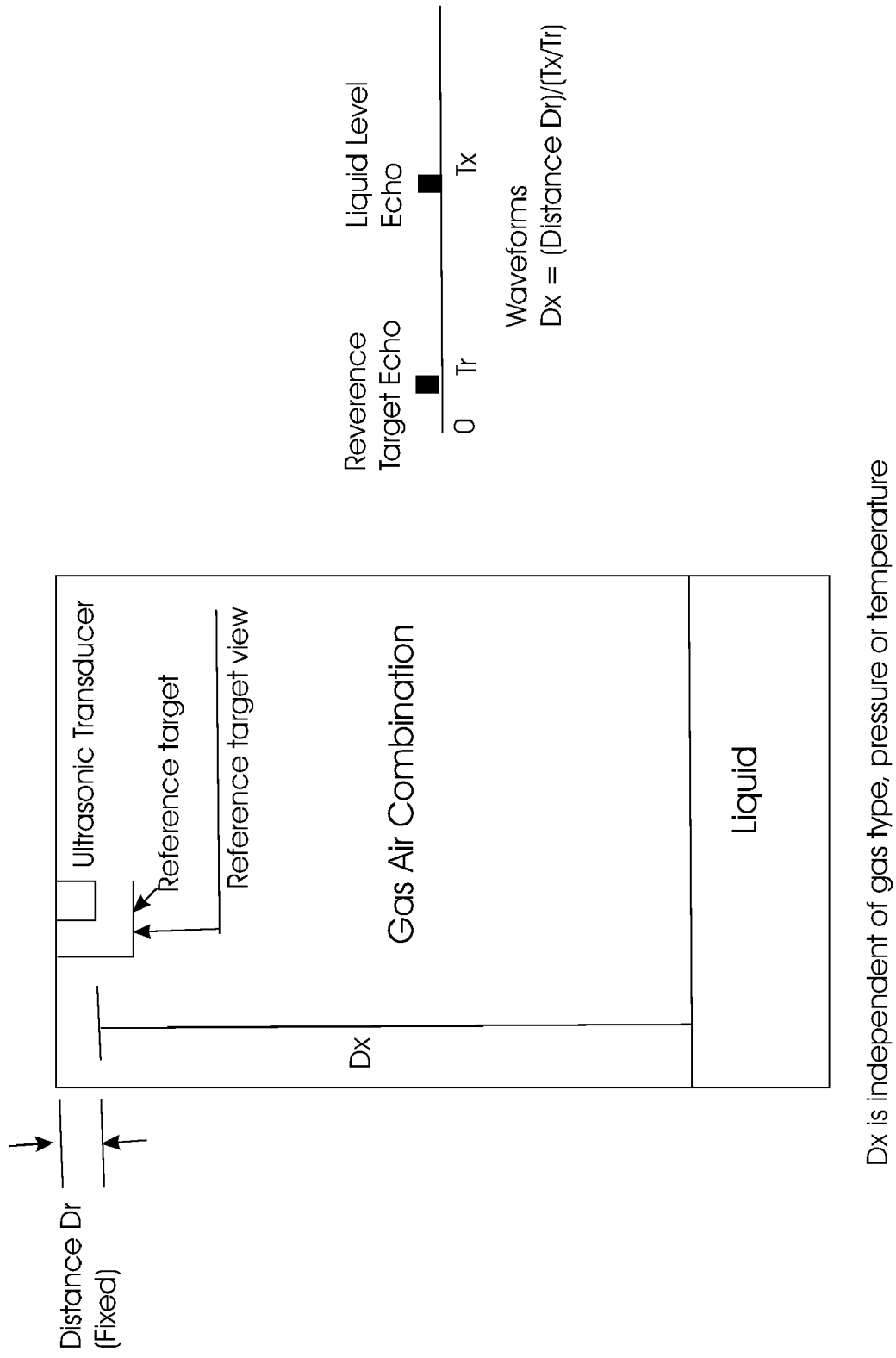
FIG. 9 is a schematic illustration of the method of FIG. 8.

FIG. 8 shows one preferred method of determining the level of a fluid in a tank that is independent on temperature or the speed of sound. FIG. 9 is a schematic illustration of the method of FIG. 8.

In some embodiments, the control unit/processor 604 is arranged to compensate for thermal and/or gas density gradients in the interior of the tank. Different ways in which the received waves can be analyzed and processed while compensating for thermal and/or gas density gradients are known to those skilled in the art. Compensation for gas density gradients is particularly appropriate when using ultrasonic sensors and thus the processor which receives information about the ultrasonic waves reflected from the upper surface of the liquid and determines the distance between the ultrasonic sensor and the upper surface of the liquid (which enables a determination of the level of fluid in the storage tank) would also be programmed to compensate for such gas density gradients (possibly in a manner described above in section 1.1.3). Any additional gas density sensors which would be required to determine gaseous stratification of the area above the liquid may be mounted to the housing.

In an embodiment described above, each wave receiving device 606 receives waves from the upper surface of the fluid and from its associated reference target 601 so that the control unit/processor 604 can analyze the waves and determine the level of fluid in the tank, since it knows the distance between each wave receiving device 606 and its associated reference target 601. In another embodiment, the control unit/processor 604 compares waves received by each wave receiving device 606 at different times and obtains information about the fluid in the tank based on the comparison of the waves received by the wave receiving device 606 at different times. When multiple wave receiving devices are provided, the control unit/processor analyzes waves received by the wave receiving devices 606 and obtains information about the fluid in the tank on the analysis of these waves.

Other sensors can be incorporated into the storage tank monitoring system including those described with regard to shipping containers or truck trailers elsewhere herein. For example, low power chemical or biological sensors can be incorporated to monitor the chemical nature of the contents of the tank. Similarly, temperature, pressure or other sensors can be added such as a camera that monitors the environment surrounding the tank and alerts the tank owner when the tank is approached or breached. Additional sensors include MIR leakage detectors, sound, light, inertial sensors, radar, etc. Magnetic or other sensors, for example, can detect the approach of a truck that might be used to move the tank. As such, in other embodiments of the invention, the interior sensor system includes one or more additional sensors 605 for performing any one of a number of different functions, and which are coupled to the control unit/processor 604. For example, a chemical sensor may be provided to monitor the chemical nature of the fluid in the tank, and an exterior or environmental sensor may be provided to monitor an environment around the tank to obtain information about the environment around the tank. Additional sensors include a temperature sensor, a pressure sensor, a carbon dioxide sensor, a humidity sensor, a hydrocarbon sensor, a narcotics sensor, a mercury vapor sensor, a radioactivity sensor, a microphone, an electromagnetic wave sensor, electric or magnetic field sensor and a light sensor.

In some embodiments, additional sensors may be mounted on, in or around the storage tank housing with a view toward improving the security of the storage tank and the fluid therein. Such sensors include sound sensors, vibration sensors and light sensors, the output of which would be provided to the control unit/processor 604 which could analyze the output and enable a determination as to whether the storage tank of fluid therein is being tampered with or other subject to unauthorized use, conversion, removal or modification.

As mentioned, other fluid level determining systems can also be used and all such systems are within the scope of this invention. Once a level system has been chosen, then it can be combined with a satellite, such as provided by SkyBitz, Inc., or internet-based monitoring system in the same or similar manner as the shipping container monitoring systems discussed elsewhere herein. Thus, once the interior sensor system in any of the embodiments described above obtains information about the fluid in the tank and optional additional information about the tank, it provides this information to a communication system which may also be housed in the same housing as control unit/processor 604. The communication system directs this information along with information about the location of the tank obtained from the location determining system to one or more remote facilities 607, using for example, a satellite link, an internet link and the like.

To optimize monitoring of the tank, the control unit/processor may include an initiation device for periodically initiating the wave receiving device(s) 606, and/or other sensors when present, to obtain information about the fluid in the tank and/or the condition of the tank. A wakeup sensor system may thus be provided for detecting the occurrence of an internal or external event, or the absence of an event for a time period, requiring a change in the frequency of monitoring of the tank. The initiation device is coupled to the wakeup sensor system and arranged to change the rate at which it initiates the wave receiving device(s) 606 and/or other sensors to obtain information about the fluid in the tank and/or the condition of the tank in response to the detected occurrence of an internal or external event by the wakeup sensor system. The initiation device and wakeup sensor system may be integrated into the control unit/processor 604 or separate therefrom.

In one embodiment, a motion or vibration detection system is arranged to detect motion or vibration of the tank or a part thereof. The interior sensor system, e.g., the wave receiving device(s) 606, are coupled to the motion or vibration detection system and obtain information about the fluid of the interior of the housing only after the tank or a part thereof is determined to have moved from a stationary position or vibrated. Similarly, a wakeup sensor system can be mounted on the housing of the tank for detecting the occurrence of an internal or external event relating to the condition or location of the fluid in the housing or the tank. The communication system may be coupled to the wakeup sensor system and arranged to transmit a signal relating to the detected occurrence of an internal or external event. Whenever desired or necessary, a memory unit may be coupled to the control unit/processor 604 or part thereof and stores data relating to the location of the tank and the fluid in the interior of the housing. The motion or vibration detection system and wakeup sensor system may be integrated into the control unit/processor 604 or separate therefrom.

A motion sensor may be arranged on the housing for monitoring motion of the housing, when the housing is in particular a movable fluid storage tank such as a Frac tank, and an alarm or warning system coupled to the motion sensor and which is activated when the motion sensor detects dangerous motion of the housing. The motion sensor and alarm or warning sensor system may be integrated into the control unit/processor 604 or separate therefrom.

The interior sensor system, e.g., the wave receiving device(s) 606, the location determining system and the communication system preferably all have low power requirements. A battery, e.g., a rechargeable battery, may be coupled to the interior sensor system, the location determining system and the communication system for providing power thereto.

In addition to information being obtained based on changes in the condition or state of the housing, it is also possible to cause the interior sensor system to obtain information upon receipt of a command from the remote facility 607. In this case, the link between the communications device in the control unit/processor 604 is bi-directional and allows for reception of a command from a remote facility 607 to cause the wave receiving device(s) 606 to operate and obtain information about the fluid in the tank. This information is subsequently transmitted to the remote facility 607. In another case, the interior sensor system includes a combination of optical and ultrasonic or other wave-type receiving devices, each such device being represented by reference numeral 606. An optical system 606 is mounted on the housing to characterize the contents in the tank, e.g., determine the nature of the fluid, its identity or composition, and an ultrasonic system 606 is used to determine the fluid level. Both such systems would be coupled to the control unit/processor 604 which would coordinate information gathering by both systems and transmit messages to the remote facility 607 about the nature of the fluid and its level, along with a location or position indication obtained from the location determining system. Such an optical system may be as described herein and would generally include an optical sensor which obtains images of the fluid and can analyze the images to determine the nature of the fluid. This may be achieved using pattern recognition technologies.

In another embodiment, only optical systems are used, represented by reference numeral 606 in FIGS. 6 and 7, since an optical system could also determine the level of fluid in a tank. In this case, one or more markings are provided along the inner surface of the tank, or on other members extending along the height of the tank in the interior of the tank. The optical system obtains images including the marking(s) and can analyze the images to determine the level of the fluid. In one particular embodiment, the optical system is designed to project scales on the inner surface of three walls of the housing, or at three different location on the inner surface of the housing wall or walls, and obtain images of the wall(s) at the projected locations of the scales. This information is used to derive the level of fluid in the tank, e.g., using a trained pattern recognition techniques such as a trained neural network. The training may involve obtaining images when different, but known, levels of fluid are present in the tank, and the tank is at different inclinations. Images are obtained for different tank levels and different inclinations and input into a neural network generating program which provides a neural network which is capable of outputting a fluid level upon receiving images of the three projected scales.

In a preferred embodiment, a single ultrasonic wave receiving device 606 is mounted to an inner surface of the housing and is sealed into a enclosure to prevent damage caused by any fluids in the housing. A two axis tilt or angle sensor 605 is also mounted to the housing and this sensor 605 as well as the wave receiving device 606 are coupled to the control unit/processor 604. The control unit/processor 604 receives signal corresponding to or representative of the waves received by the wave receiving device 606, or information derived therefrom at the wave receiving device 606, along with the information about inclination of the housing from the tilt sensor 605 and the location of the tank from the location determining system and forms a message for transmission to the remote facility 607.

The remote facility 607 which monitors the storage tanks would receive messages, e.g., via the Internet or a satellite link, each containing the location of the tank and information about the fluid therein. The remote facility 607 could also be designed to enable monitoring of selected ones or all of the storage tanks via the wave receiving devices if a bi-directional communications device is coupled to or part of the control unit/processor 604 associated with each storage tank. A report about the storage tanks can be compiled by a processor or control unit at the remote facility 607 and alarms or warnings provided to monitoring personnel if a problem is detected with any of the fluids in the storage tanks or a problem is detected with any of the storage tanks.

When the communication system in the control unit/processor 604 on the housing of the tank allows for bi-directional communications, the tank can be provided with one or more controlled systems or components which can be commanded by the remote facility 607 to undertake a specific action. This would be in addition to the ability of the remote facility 607 to command the interior sensor system, e.g., the wave receiving device(s) 606 to undertake a reading. Such controlled systems may be a fire extinguisher on the tank or a cleaning system, a valving system and the like. Any of these such systems can be coupled to the control unit/processor 604 and commanded via the link to the remote facility 607. This therefore provides for remote control of systems on the tank.

Referring now to FIGS. 10 and 11, another embodiment of a fluid level measuring system in accordance with the invention for particular use with storage tanks includes a buoyant housing 608 which floats on the liquid in the storage tank housing. Housing 608 includes a first transducer 610 arranged to face upward and a second transducer 611 arranged to face downward.

Transducer 610 may be an ultrasonic or RF transducer which is capable of providing information to enable a determination of or possibly actually determining the range of distance to the top of the storage tank, i.e., the distance between the housing 608 and the top of the storage tank. If transducer 610 is an ultrasonic transducer, it directs ultrasonic waves at the inner surface of the top wall of the storage tank and receives reflected ultrasonic waves.

Transducer 611 may be an ultrasonic transducer which is capable of providing information to enable a determination of or possibly actually determining the range or distance to the bottom of the storage tank. If transducer 611 is an ultrasonic transducer, it directs ultrasonic waves at the inner surface of the bottom wall of the storage tank and receives reflected ultrasonic waves.

A processor/communications unit 612 is connected to transducers 610, 611 and, when the transducers 610, 611 only provide data about the reflected waves but not the range or distance information, the processor determines the range or distance between the housing 608 and both the top and bottom of the storage tank. From the range or distance determinations, processor 612 is thus capable of determining the level (L) of the liquid if the height (H) of the tank is known (and provided to the processor 612). The processor 612 could also correct for other variables in the determinations, such as temperature, pressure and gas density as disclosed herein.

If the speed of sound in the liquid or the gas is provided to or otherwise determined by sensors connected to the processor 612, it can then determine the fluid level using the data from only one of the transducer 610, 611. For example, if the speed of sound in the liquid is known, the processor 612 can determine the level of fluid based on the data provided by transducer 611.

In one embodiment, a reference target is arranged in the field of view of transducer 610 and thus, only transducer 610 would be needed to enable a determination of the level of liquid in the tank. In this case, housing 608 would not include transducer 611.

Processor 612 includes a communications unit or system which communicates with the remote facility 607, either directly or indirectly, e.g., through an intermediate structure which receives wireless signals from the processor/communications unit 612 indicative of the level of liquid in the tank and relays them to the remote facility 607.

It is noted that additional methods for measuring the level of liquid in the storage tanks may be use din the invention, such as those described in a book, Measurement and Control of Liquid Level. Any of these level measuring techniques may be use din the invention, when used in combination with a communications unit which is capable of forwarding the measured liquid level to a remote facility or engaging in bi-directional communications with a remote facility to enable the remote facility to initiate a liquid level measurement.

1.6 Telematics for Reservoirs

In a similar manner as the condition and fluid level in storage tanks are remotely monitored as described above in section 9.6., open reservoirs can also be remotely monitored. A reservoir generally differs from a storage tank in that it does not include a cover and is therefore exposed to the ambient atmosphere. Nevertheless, one or more wave receiving devices can each be positioned to have a field of view of the upper surface of the reservoir, and optionally a reference target in the reservoir if one is used, and therefore enable a determination of the level of fluid in the reservoir, of information about the chemical nature of the fluid, and the other information described above for monitoring storage tanks.

A controller is coupled to the wave receiving devices and is provided with the location of the reservoir. Since the location of the reservoir is typically invariable, the location, once provided, does not need to be changed.

The remote facility which monitors the reservoirs would receive messages, e.g., via the Internet or a satellite link, each containing the location of the reservoir and information about the fluid therein. The remote facility could also be designed to enable monitoring of the reservoir via the wave receiving devices if a bi-directional communications device is coupled to or part of the controller located at or near the reservoir. A report about the reservoir can be compiled by a processor or control unit at the remote facility and alarms or warnings provided to monitoring personnel if a problem is detected with any of the fluids in the reservoirs or a problem is detected with any of the reservoirs.

When the communication system in the controller associated with the reservoir allows for bi-directional communications, the reservoir can be provided with one or more controlled systems or components which can be commanded by the remote facility to undertake a specific action. This would be in addition to the ability of the remote facility to command the wave receiving device(s) to undertake a reading. Such controlled systems may be a cleaning system, a chemical introduction system, a valving system and the like. Any of these such systems can be coupled to the controller and commanded via the link to the remote facility. This therefore provides for remote control of systems associated with the reservoir.

2. Monitoring of other Vehicles such as Cargo Containers, Truck Trailers and Railroad Cars 2.1 Monitoring the Interior Contents of a Shipping Container, Trailer, Boat, Shed, etc.

Commercial systems are now available from companies such as SkyBitz Inc. 22455 David Dr., Suite 100, Sterling, Va. 20164, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite (GEO) providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases, an ultracapacitor as discussed above can be used in place of a battery.

The SkyBitz system by itself only provides information as to the location of a container and not information about its contents, environment, and/or other properties. At least one of the inventions disclosed herein disclosed here is intended to provide this additional information, which can be coded typically into a few bytes and sent to the satellite along with the container location information and identification. First consider monitoring of the interior contents of a container. From here on, the terms "shipping container" or "container" will be used as a generic cargo holder and will include all cargo holders including standard and non-standard containers, boats, trucks, trailers, sheds, warehouses, storage facilities, tanks, buildings or any other such object that has space and can hold cargo. All of these "containers" will be considered vehicles as defined above for the purposes of this disclosure.

One method of monitoring the space inside such a container is to use ultrasound such as disclosed in U.S. Pat. Nos. 5,653,462, 5,829,782, USRE37260 (a reissue of U.S. Pat. No. 5,943,295), U.S. Pat. Nos. 5,901,978, 6,116,639, 6,186,537, 6,234,520, 6,254,127, 6,270,117, 6,283,503, 6,341,798, and 6,397,136 for monitoring the interior of a vehicle. Also, reference is made to U.S. Pat. Nos. 6,279,946, which discusses various ways to use an ultrasonic transducer while compensating for thermal gradients. Reference is also made to U.S. Pat. Nos. 5,653,462, 5,694,320, 5,822,707, 5,829,782, 5,835, 613, 5,485,000, 5,488,802, 5,901,978, 6,039,139, 6,078,854, 6,081,757, 6,088,640, 6,116,639, 6,134,492, 6,141,432, 6,168,198, 6,186,537, 6,234,519, 6,234,520, 6,242,701, 6,253,134, 6,254,127, 6,270,116, 6,279,946, 6,283,503, 6,324,453, 6,325,414, 6,330,501, 6,331,014, RE37260, U.S. Pat. Nos. 6,393,133, 6,397,136, 6,412,813, 6,422,595, 6,452, 870, 6,42,504, 6,445,988, 6,442,465, which disclose inventions that may be incorporated into the invention(s) disclosed herein.

Consider now a standard shipping container that is used for shipping cargo by boat, trailer, or railroad. Such containers are nominally 8'w×8'h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

Note that in many cases several transducers are used for monitoring the vehicle such as a container that typically point in slightly different directions. This need not be the case and a movable mounting is also contemplated where the motion is accomplished by any convenient method such as a magnet, motor, etc.

Referring to FIG. 1, a container 480 is shown including an interior sensor system 481 arranged to obtain information about contents in the interior of the container 480. The interior sensor system includes a wave transmitter 482 mounted at one end of the container 480 and which operatively transmits waves into the interior of the container 480 and a wave receiver 483 mounted adjacent the wave transmitter 482 and which operatively receives waves from the interior of the container 480. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and as discussed more fully below, be designed to compensate for thermal gradients in the interior of the container 480. Information about the contents of the container 480 may comprise the presence or motion of objects in the interior. The processor may be associated with a memory unit which can store data on the location of the container 480 and the analysis of the data from the interior sensor system 481.

The container 480 also includes a location determining system 486 which monitors the location of the container 480. To this end, the location determining system can be any asset locator in the prior art, which typically include a GPS receiver, transmitter and appropriate electronic hardware and software to enable the position of the container 480 to be determined using GPS technology or other satellite or ground-based technology including those using the cell phone system or similar location based systems.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet.

The container 480 also includes a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on switches, magnetic sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 is coupled to the interior sensor system 481, or at least to the transmitters 482,482' so that the transmitters 482,482' can be designed to transmit waves into the interior of the container 480 only when the door status sensor 487 detects when at least one door 484 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 480 and the doors 484 closed, an initial pulse transmission can be initiated and the received signal stored to provide a vector of data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in above-referenced patents and patent applications through the use, for example, of a logarithmic compression circuit. There are other methods of minimizing the effect on the reflected wave magnitudes that will accomplish substantially the same result.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described for automobile interior monitoring in above-referenced patents and patent applications, and therefore this process is not repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Other locations of such a scanning system are possible.

In both of these examples, relatively little can be said about the contents of the container other then that something is present or that the container is empty. Frequently this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects within the container 480 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 1, wires (not shown) are used to connect the various sensors and devices. It is contemplated that all of the units in the monitoring system can be coupled together wirelessly, using for example the Bluetooth, WI-FI or other protocol.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones or MIR (Micropower Impulse Radar). Note that all such sensors regardless of where they are placed are contemplated herein and are part of the present inventions.

Chemical sensors 491 based on surface acoustic wave (SAW) or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, although heretofore not appreciated, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the aforementioned SAW devices in connection within or on a vehicle for any purpose other than tire pressure and temperature monitoring or torque monitoring is new and contemplated by the inventions disclosed herein. Only a small number of examples are presented of the general application of the SAW, or RFID, technology to vehicles.

Another technology that can be used in place of the SAW chemical sensors is based on MEMS. A two-dimensional array of very small cantilevered beams can be formed using MEMS etching technology and each of the beams can be coated with a reagent that reacts with a known chemical or biological species. In the presence of such a substance, the mass of the beam will increase as the reactant absorbs the chemical or biological substance. This mass increase in turn affects the natural frequency of the beam and thus the mass increase can be measured indicating the presence of the substance. Since reactants often react with a variety of substances with varying degrees of absorption, the pattern of natural frequency changes on a variety of beams can be analyzed using neural networks, for example, to determine what species or what relative concentration of a group of species is present. Such a device has recently been developed, for examples, for analyzing French perfumes.

Other sensors that can be designed to operate under very low power levels include microphones 492 and light sensors 493 or sensors sensitive to other frequencies in the electromagnetic spectrum as the need arises. The light sensors 493 could be designed to cause activation of the interior sensor system 481 when the container is being switched from a dark condition (normally closed) to a light situation (when the door or other aperture is opened). A flashlight could also activate the light sensor 493.

Instead of one or more batteries providing power to the interior sensor system 481, the communication system 485 and the location determining system 486, solar power can be used. In this case, one or more solar panels 494 are attached to the upper wall of the container 480 (see FIG. 1) and electrically coupled to the various power-requiring components of the monitoring system. A battery can thus be eliminated. In the alternative, since the solar panel(s) 494 will not always be exposed to sunlight, a rechargeable battery can be provided which is charged by the solar panel 494 when the solar panels are exposed to sunlight. A battery could also be provided in the event that the solar panel 494 does not receive sufficient light to power the components of the monitoring system. In a similar manner, power can temporarily be supplied by a vehicle such as a tractor either by a direct connection to the tractor power or though capacitive, inductive or RF coupling power transmission systems. As above an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

2.2 Monitoring the Entire Asset

Immediately above, monitoring of the interior of the container is described. If the container is idle, there may not be the need to frequently monitor the status of the container interior or exterior until some event happens. Thus, all monitoring systems on the container can be placed in the sleep mode until some event such as a motion or vibration of the container takes place. Other wakeup events could include the opening of the doors, the sensing of light or a change in the interior temperature of the container above a reference level, for example. When any of these chosen events occurs, the system can be instructed to change the monitoring rate and to immediately transmit a signal to a satellite or another communication system, or respond to a satellite-initiated signal for some LEO-based, or geocentric systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use. A ubiquitous internet based communications system will be a preferred system of the future.

FIG. 2 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of "sleep". In this manner, the wakeup sensor would not be activated repeatedly in traffic stop and go situations. A similar system would also be applicable for storage tanks.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal is sent at 497 to a monitoring facility via the communication system 485 and which includes the location of the container 480 obtained from the location determining system 486 or by the ID for a permanently fixed container or other asset, structure or storage facility or tank. In this manner, if the motion is determined to deviate from the expected handling of the container 480, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo.

An alternate method is to put weight sensors in the floor or as a mat on the floor of the vehicle. The mat design can use the bladder principles described above for weighing b vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit (IMU). If a source of position is also known such as from a GPS system then the errors inherent in the IMU can be corrected using a Kalman filter.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Figure 3A:
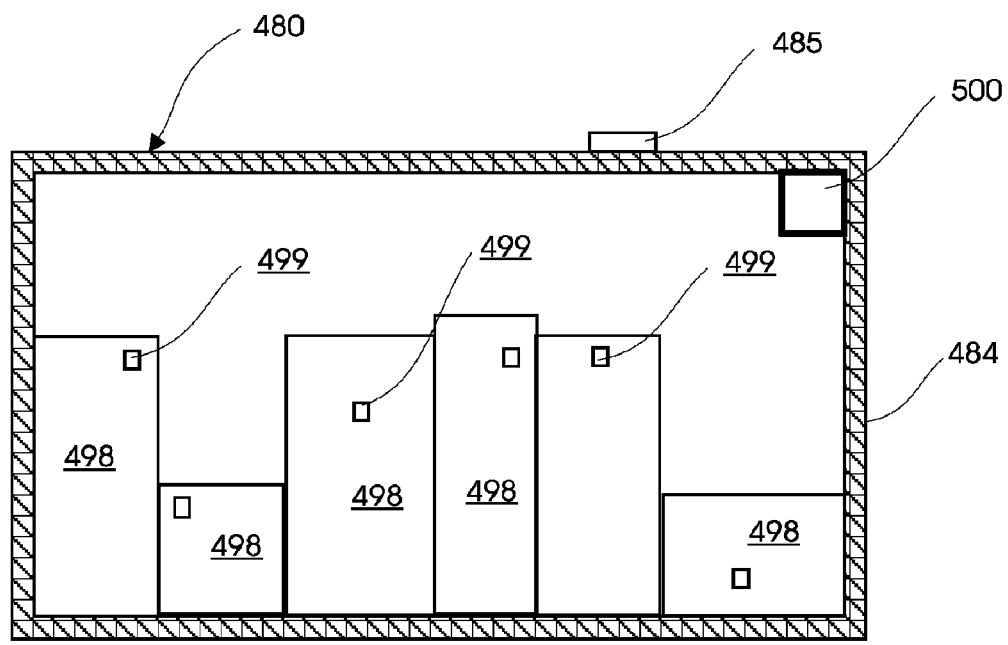
FIG. 3A is a cross-sectional view of a container showing the use of RFID technology in a monitoring system and method in accordance with the invention.
Figure 3B:
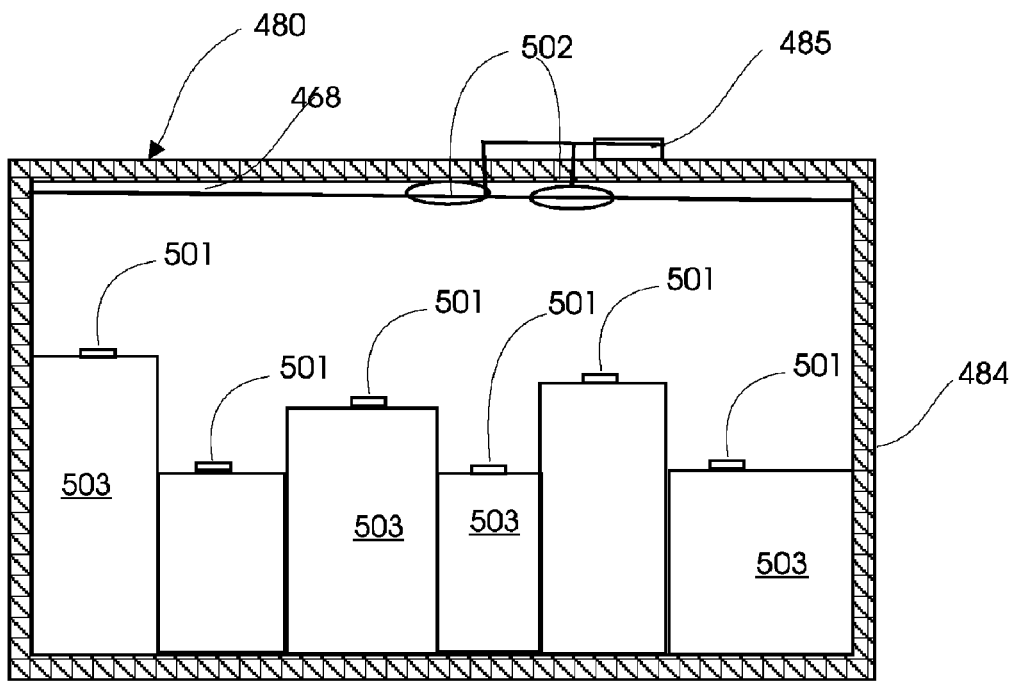
FIG. 3B is a cross-sectional view of a container showing the use of barcode technology in a monitoring system and method in accordance with the invention.
Figure 3C:
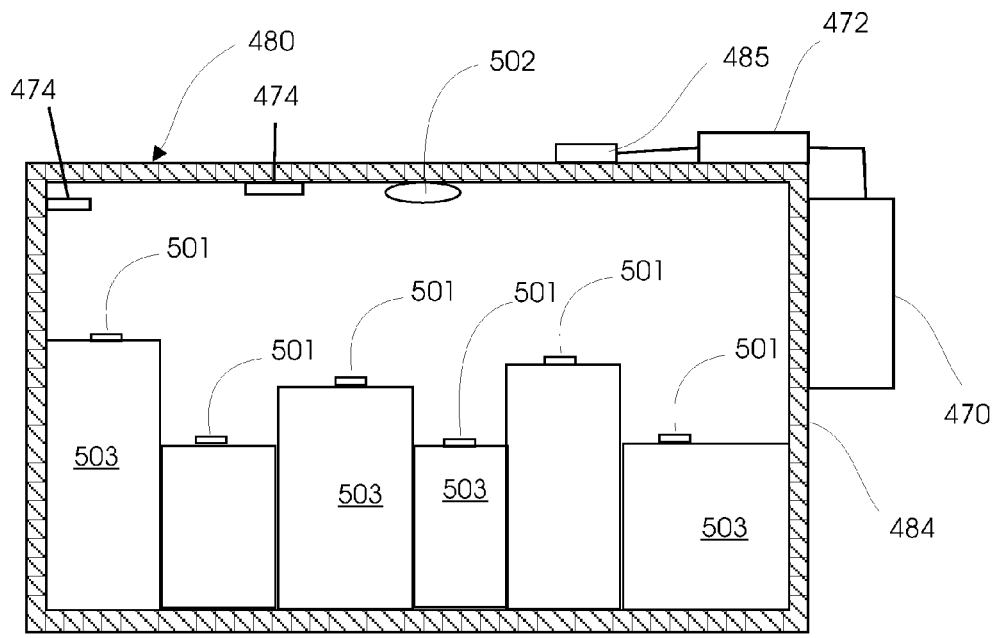
FIG. 3C is a cross-sectional view of a refrigerated container showing the use of a diagnostic module in a monitoring system and method in accordance with the invention.

Referring now to FIG. 3C, another application of monitoring the entire asset would be to incorporate a diagnostic module 472 into the asset. Frequently, the asset may have operating parts, e.g., if it is a refrigerated and contains a refrigeration unit 470. To this end, sensors 474, e.g., temperature sensors, can be installed on the asset and monitored using pattern recognition techniques embodied in a processor of the diagnostic module 472, as disclosed in U.S. Pat. Nos. 5,809, 437 and 6,175,787. As such, various sensors 474 would be placed on the container 480 and used to determine problems with the container 480 or refrigeration unit 470 which might cause it to operate abnormally, e.g., if the refrigeration unit were about to fail because of a refrigerant leak. Sensors 474 would indicate a higher temperature than expected if the refrigeration unit 470 were not operating normally. In this case, the information about the expected failure of the refrigeration unit 470 could be transmitted to a facility, via a link between the diagnostic module 472 and the communications system 485, and maintenance of the refrigeration unit could be scheduled, e.g., based on the location of the personnel capable of fixed or replacing the refrigeration unit 470 and the location of the asset which is also transmitted by the communications unit 485. Instead of using sensors 474 apart from the refrigeration unit 470, or other operating part whose operating is being diagnosed, to determine abnormal operation, it is also possible to connect the diagnostic module 472 to the refrigeration unit 470 so that it can directly monitor the operation thereof, this connection being represented by a line in FIG. 3C.

It is anticipated that whatever entity is monitoring a plurality of assets could strategically locate personnel capable of fixing or replacing abnormally operating parts of the asset to ensure secure carriage of the goods in the asset, e.g., perishable products. Thus, when the asset provides a signal indicative of abnormal operation and its location to the remote facility, personnel at the remote facility could dispatch the nearest personnel to attend to the asset.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.
2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.
3. An infrared or carbon dioxide sensor could be used to detect human presence, although a carbon dioxide sensor would probably require a prolonged exposure.
4. Various motion sensors as discussed above can also be used, but would need to be resistant to triggering on motion typical of cargo transport. Thus a trained pattern recognition algorithm might be necessary.
5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from entry/person detector could be sent to communication network to notify interested parties of current status. Additionally, an audible alarm may be sounded and a photo could also be taken to identify the intruder. Additionally, motion sensors such as an accelerometer on a wall or floor of a vehicle such as a container or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

2.3 Recording

In many cases, it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability. Specifically, monitoring of the temperature can be used to determine whether the operating parts of the container, e.g., the refrigeration unit, fails and thereby establish liability for damage to the perishable cargo with the entity responsible for maintenance of the cargo container. In this case, data about the refrigeration unit could be transmitted to a facility operated by an entity responsible for maintenance of the cargo container, as discussed elsewhere herein, to enable them to act to rectify failure of the refrigeration unit. Such an entity might lease refrigerated cargo containers and once a failure of a refrigeration unit is detected, it could immediately notify the trucker or railroad operator transporting the container to sideline the container until the perishable cargo therein can be transferred to another refrigerated cargo container or the refrigeration unit fixed. Staff for fixing refrigeration units could be strategically positioned around areas in which leased cargo containers travel, or are expected to travel.

With reference to FIG. 3A, in some cases, the individual cargo items 498 can be tagged with RFID or SAW tags 499 and the presence of this cargo in the container 480 could be valuable information to the owner of the cargo. One or more sensors on the container that periodically read RFID tags could be required, such as one or more RFID interrogators 500 which periodically sends a signal which will causes the RFID tags 499 to generate a responsive signal. The responsive signal generated by the RFID tags 499 will contain information about the cargo item on which the RFID tag 499 is placed. Multiple interrogators or at least multiple antennas may be required depending on the size of the container. The RFID can be based on a SAW thus providing greater range for a passive system or it can also be provided with an internal battery or ultracapacitor for even greater range. Energy harvesting can also be used if appropriate.

In one method for tracking packages in accordance with the invention, the interrogator 500 includes a processor and is programmed to periodically interrogate the interior of the container 480 by transmitting radio frequency waves into the interior of the container 480. As known to known skilled in the art, the interrogator 500 receives RF signals generated by the RFID tags 499, and the processor therein interprets the received RF signals into an indication of the presence of a specific cargo item 498 (with the signal possibly providing information about the cargo item 498). The processor in the interrogator 500 can form a list of the contents of the container 480, i.e., the identified cargo items 498, and provide this list to the communications system 485 via a link thereto whereby the communication system 485 transmits this list to one or more remote facilities.

An entity managing shipment of the cargo items 498, e.g., a package delivery service company, is thus able to known the location of every box in every container 480, and the location of the container 480 when it provides its location in the transmission to the remote facility. The location of the container 480 may be provided by a positioning system 486 on the container 480 (not shown in FIG. 3A).

Bi-directional communications are also possible whereby the managing entity can initiate the interrogator 500 to interrogate the interior of the container 480. Thus, interrogator 500 can either be initiated upon command from the remote facility, at a predetermined periodic interval and/or upon detection of a condition which may give rise to a change in the contents of the container 480, e.g., opening or closing of the door as detected by a door status sensor 487 described elsewhere herein. The managing entity may perform an hourly update of the contents of its managed containers 480 to ascertain when each cargo item 498 has been removed, and thus delivered, and can thereby track the efficiency of the delivery personnel. Further, the bi-directional communications can be used to provide data about the cargo items 498 to the remote facility, e.g., when a new cargo item 498 is placed into the container, the interrogator 500 could read the indicia convert it to an identification and other information and then transmit this identification and other information to the remote facility to begin tracking of this new cargo item 498.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. In this regard, a system can be provided to notify the personnel placing the boxes 503 into the container 480 that the boxes 503 are not placed properly, i.e., the indicia thereon cannot be read. Thus, one or more attempts may be made to read the indicia on a box when it is first placed into the container and a warning provided, e.g., a visual and/or audible warning, if the box is placed such that the indicia is not readable by an optical scanner.

As shown in FIG. 3B, the cargo items in this case are boxes having variable heights and all arranged so that a space remains between the top of the boxes 503 and the ceiling of the container 480. One or more optical scanners 502, including a light transmitter and receiver, are arranged on the ceiling of the container and can be arranged to scan the upper surfaces of the boxes 503, possibly by moving the length of the container 480 (via a movement mechanism such as an actuator coupled to the optical scanner which moves along one or more rails 468 which extend along the length of the container 480), or through a plurality of such sensors. During such a scan, patterns of light are reflected from the barcodes 501 on the upper surfaces of the boxes 503 and received by the optical scanner 502. The patterns of light contain information about the cargo items in the boxes 503. Receivers can be arranged at multiple locations along the ceiling, in which case, an optical scanner includes an assembly of a light transmitter and one or more light receivers spaced apart from the light transmitter. Other arrangements to ensure that a light beam traverses a barcode 501 and is received by a receiver can also be applied in accordance with the invention. As discussed above, other tag technologies can be used if appropriate such as those based of magnetic wires.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

In one method for tracking packages in accordance with the invention, the optical scanner 502 includes a processor and is programmed to periodically generate a light beam and direct the light beam downward to read any barcodes 501 on boxes 503 in the field of view of the light beam. If movable, the optical scanner 502 is also periodically moved along the rails 468 to ensure that most if not all of the area of the interior of the container 480 is exposed to the light beam from the optical scanner 502. As known to known skilled in the art, the optical scanner 502 reads the barcodes 501, and the processor therein interprets the barcodes 501 into an indication of the presence of a particular box 503 (with the barcode 501 possibly providing information about the box 503). The processor in the optical scanner 502 can form a list of the contents of the container 480, i.e., the identified boxes 503, and provide this list to the communications system 485 via a link thereto whereby the communication system 485 transmits this list to one or more remote facilities.

An entity managing shipment of the boxes 503, e.g., a package delivery service company, is thus able to known the location of every box in every container 480, and the location of the container 480 when it provides its location in the transmission to the remote facility. The location of the container 480 may be provided by a positioning system 486 on the container 480 (not shown in FIG. 3B).

Bi-directional communications are also possible whereby the managing entity can initiate the optical scanner 502 to read the barcodes 501 from the boxes 503. Thus, optical scanner 502 can either be initiated upon command from the remote facility, at a predetermined periodic interval and/or upon detection of a condition which may give rise to a change in the contents of the container 480, e.g., opening or closing of the door as detected by a door status sensor 487 described elsewhere herein. The managing entity may perform an hourly update of the contents of its managed containers 480 to ascertain when each box 503 has been removed, and thus delivered, and can thereby track the efficiency of the delivery personnel. Further, the bi-directional communications can be used to provide data about the packages to the remote facility, e.g., when a new box 503 is placed into the container, the optical scanner 502 could read the indicia, convert it to an identification and other information and then transmit this identification and other information to the remote facility to begin tracking of this new box 503.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a satellite. Typically, the contents of the container are more valuable than the truck or chassis for the case of when the container is not a trailer. If the tractor, train, plane or ship that is transporting the container is experiencing difficulties, then this information can be transmitted to the satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. Nos. 5,809,437 and 6,175,787, and herein. Whatever the source of the diagnostic information, especially when valuable or dangerous cargo is involved, this information in coded form can be transmitted to a ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology to give greater range or could contain a battery or ultracapacitor for even greater range. The tag can be in a sleep mode until receiving a wakeup call to further conserve battery power.

Figure 4:
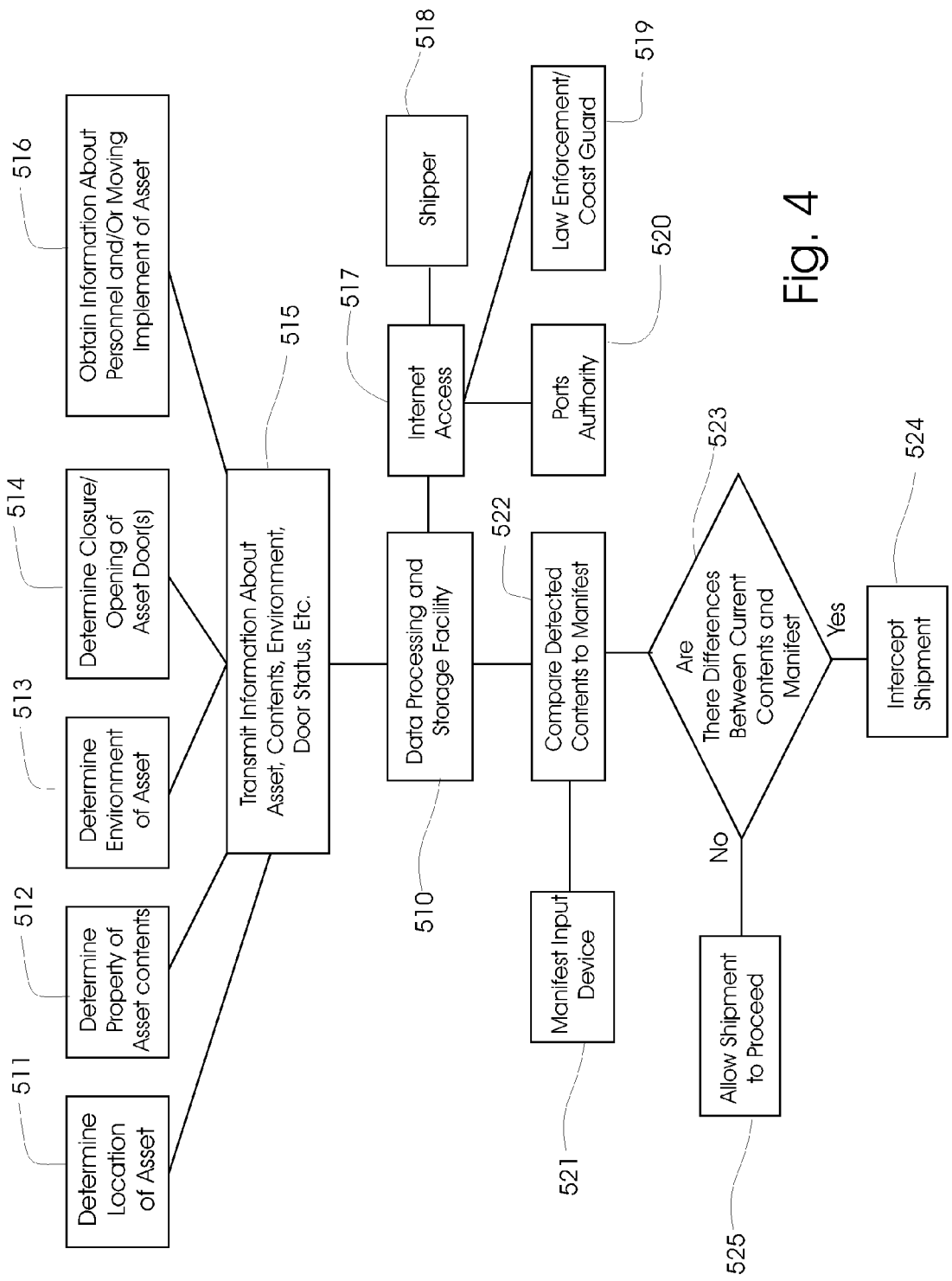
FIG. 4 is a flow chart showing one manner in which multiple assets are monitored in accordance with the invention.

FIG. 4 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525.

2.4 Exterior Monitoring Near a Vehicle

Having the ability to transmit coded information to a satellite, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in *Alien Vision: Exploring the Electromagnetic Spectrum With Imaging Technology* (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

A wide variety of smart cards, biometric identification systems (such as fingerprints, voice prints and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance.

2.5 Analysis

Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. In some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

2.6 Safety

There are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

2.7 Other Remote Monitoring

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a satellite system exists such as the Skybitz, for example, LEO or geostationary satellite system coupled with a low cost low power small GPS receiver and communication device capable of sending information periodically to the satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example could be the monitoring of a vacation home during the months when the home is not occupied. Of course, any home could be so monitored even when the occupants leave the home unattended for a party, for example. The monitoring system could determine whether the house is on fire, being burglarized, or whether temperature is dropping to the point that pipes could freeze due to a furnace or power failure. Such a system could be less expensive to install and maintain by a homeowner, for example, than systems supplied by ADT, for example. Monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. If a power source is available, it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a transmitter and a LEO, geostationary or other satellite, however, it need not be the case and communication can be by cell phone, an ad hoc peer-to-peer network, IEEE 801.11, Bluetooth, or any other wireless system. Thus, using the teachings of at least one of the inventions disclosed herein, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to a satellite or other telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service. See also section 9.2.

The invention described here can provide the three above-mentioned highly desired services without requiring a high monthly fee. A simple device that communicates to a satellite or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A wake-up can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are a preferred approach.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the satellite or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use of the Skybitz system, for example, where the asset mounted device has further wireless communications with other devices in or on the asset. The fact that certain tagged items within or on the assets can be verified if a local area network exists between the Skybitz device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the Skybitz device. The possibilities are endless for determining the presence or operating parameters of a component of occupying item of a remote asset and to periodically communicate this information to an internet site, for example, using a low power asset monitoring system such as the Skybitz system.

The Skybitz or similar system can be used with cell phones to provide a location determination in satisfaction to US Federal regulations. The advantage of this use of Skybitz is that it is available world wide and does not require special equipment at the cell phone station. This also permits an owner of a cell phone to determine its whereabouts for cases where it was lost or stolen. A similar system can be added to PDAs or other CD players, radios, or any other electronic device that a human may carry. Even non electronic devices such as car keys could be outfitted with a Skybitz type device. It is unlikely that such a device would have a 10 year life but many of them have batteries that are periodically charged and the others could have a very low duty cycle such that they last up to one year without replacement of the battery and then inform the owner that the battery is low. This information process could even involve the sending of an email message to the owner's email stating the location of the device and the fact that the battery needs replacement.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations.

Also, any of the apparatus and methods disclosed herein may be used for diagnosing the state of operation or a plurality of discrete components.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for tracking packages in a cargo container, the packages including optically readable indicia, comprising:
  movably mounting at least one optical imager to an interior surface of the container capable of reading the optically readable indicia on the packages;
  operatively reading the indicia from the packages using the at least one optical imager that obtains images of the indicia;
  converting the read indicia into an identification of the packages using a processor on the container;
  transmitting the package identifications from the container to a location off of the container using a transmission system;
  attempting to read the indicia on each package via the at least one optical imager when the package is first placed into the container; and
  moving the at least one optical imager to vary its field of view when the indicia on a package is unable to be read via the at least one optical imager when the package is first placed into the container.

2. The method of claim 1, wherein the package identifications are transmitter from the container to a remote facility using the transmission system, further comprising:
  arranging a sensor on the container to detect entry into the container or a person in the container; and
  controlling the transmission of the package identifications to the remote facility using the transmission system based on information from the sensor.

3. The method of claim 1, further comprising controlling the at least one optical imager to read the indicia of any packages in the container at predetermined times other than when each package is placed into the container, upon command from the remote facility, upon a change in temperature of the container as detected by a temperature sensor, upon a change in location of the container as detected by a location determining system arranged on the container or upon detection of an event which could result in a change in the contents of the container.

4. A method for tracking packages in a cargo container, the packages including optically readable indicia, comprising:
  mounting at least one optical imager to an interior surface of the container capable of reading the optically readable indicia on the packages;
  operatively reading the indicia from the packages using the at least one optical imager that obtains images of the indicia;

converting the read indicia into an identification of the packages using a processor on the container;

transmitting the package identifications from the container to a remote facility using a transmission system;

attempting to read the indicia on a package when it is first placed into the container; and providing a warning if the package is placed such that the indicia is not readable by the at least one optical imager.

5. The method of claim 4, further comprising controlling the at least one optical imager to read the indicia of any packages in the container at predetermined times other than when each package is placed into the container, upon command from the remote facility, upon a change in temperature of the container as detected by a temperature sensor, upon a change in location of the container as detected by a location determining system arranged on the container or upon detection of an event which could result in a change in the contents of the container.

6. A method for tracking packages in a cargo container, the packages including optically readable indicia, comprising:

mounting at least one optical imager to an interior surface of the container capable of reading the optically readable indicia on the packages;

operatively reading the indicia from the packages using the at least one optical imager that obtains images of the indicia;

converting the read indicia into an identification of the packages using a processor on the container; and transmitting the package identifications from the container to a location off of the container using a transmission system;

wherein the step of mounting at least one optical imager comprises arranging a single emitter on the container and a plurality of light receivers at different locations.

7. A system further for tracking packages in a cargo container, the packages includes optically readable indicia, comprising:

at least one optical imager mounted to an interior surface of the container capable of reading the indicia on the packages, said at least one imager being arranged to operatively read the indicia from the packages by obtaining images including the indicia and convert the read indicia into an identification of the packages by analyzing the images;

a communications system coupled to said at least one optical imager for transmitting the package identifications to a location off of the container; and a system that moves said at least one optical imager to vary its field of view, wherein said at least one optical imager is controlled to attempt to read the indicia on each package when the package is first placed into the container, and said at least one optical imager is moved via said system to vary its field of view when the indicia on a package is unable to be read via said at least one optical imager when the package is first placed into the container.

8. A system for tracking packages in a cargo container, the packages includes optically readable indicia, comprising:

at least one optical imager mounted to an interior surface of the container capable of reading the indicia on the packages, said at least one imager being arranged to operatively read the indicia from the packages by obtaining images including the indicia and convert the read indicia into an identification of the packages by analyzing the images; and a communications system coupled to said at least one imager for transmitting the package identifications to a location off of the container;

wherein said at least one optical imager comprises a single emitter and a plurality of light receivers arranged at different locations.

9. The system of claim 8, wherein the location off of the container to which the package identifications are transmitted by said communications system is a remote facility separate and apart from the container, further comprising:

a sensor system arranged on the container to detect entry into the container or a person in the container, the transmission of the package identifications to the remote facility using said communications system being based on information from said sensor system.

10. A method for tracking packages in a cargo container, the packages including optically readable indicia, comprising:

mounting at least one optical imager to an interior surface of the container capable of reading the optically readable indicia on the packages;

operatively reading the indicia from the packages using the at least one optical imager that obtains images of the indicia;

converting the read indicia into an identification of the packages using a processor on the container;

transmitting the package identifications from the container to a location off of the container using a transmission system arranged on the container;

attempting to read the indicia on a package when it is first placed into the container; and providing a warning via a warning device if the package is placed such that the indicia is not readable by the at least one optical imager.

11. The method of claim 10, further comprising:

arranging a light sensor on the container to detect a change in light in the container; and controlling the reading of indicia based on the detection of a change in light in the container such that changes in light in the container cause reading of the indicia from the packages.

12. The method of claim 10, wherein the at least one optical imager comprises a plurality of optical imagers arranged to cover a field of view encompassing the entire interior of the container.

13. The method of claim 10, wherein the indicia is a barcode.

14. The method of claim 10, further comprising changing the position of the packages such that the indicia is capable of being read by the at least one optical imager when the warning is provided by the warning device.

15. The method of claim 10, further comprising controlling the at least one optical imager to read the indicia at predetermined times, upon command from a remote facility, upon a change in temperature of the container as detected by a temperature sensor, upon a change in location of the container as detected by a location determining system arranged on the container or upon detection of an event which could result in a change in the contents of the container.

16. The method of claim 10, wherein the location off of the container to which the package identifications are transmitted using the transmission system is a remote facility separate and apart from the container, further comprising:

arranging a positioning system on the container to determine its location; and transmitting the location of the container to the remote facility with the package identifications using the transmission system.

17. The method of claim 10, further comprising:
detecting opening of a door or port of the container, vibration of the container or sound in the container; and
controlling the reading of indicia based on the detection of the opening of the door or port, vibration of the container or the sound in the container.

18. A system for tracking packages in a cargo container, the packages includes optically readable indicia, comprising:
at least one optical imager mounted to an interior surface of the container capable of reading the indicia on the packages, said at least one imager being arranged to operatively read the indicia from the packages by obtaining images including the indicia and convert the read indicia into an identification of the packages by analyzing the images; and
a communications system coupled to said at least one imager for transmitting the package identifications to a location off of the container;
wherein said at least one imager is controlled to attempt to read the indicia on each package when the package is first placed into the container and a warning is provided when the package is placed such that the indicia is not readable by said at least one optical imager.

19. The system of claim 18, further comprising:
a light sensor arranged on the container to detect a change in light in the container, the reading of indicia via said at lest one optical imager being controlled based on the detection of a change in light in the container such that changes in light in the container cause reading of the indicia from the packages.

20. The system of claim 18, wherein said at least one optical imager comprises a plurality of optical imagers arranged to cover a field of view encompassing the entire interior of the container.

21. The system of claim 18, wherein the indicia is a barcode.

22. The system of claim 18, wherein said at least one imager is controlled to read the indicia at predetermined times, upon command from a remote facility, upon a change in temperature of the container as detected by a temperature sensor, upon a change in location of the container as detected by a location determining system arranged on the container or upon detection of an event which could result in a change in the contents of the container.

23. The system of claim 18, wherein the location off of the container to which the package identifications are transmitted by said communications system is a remote facility separate and apart from the container, further comprising a positioning system arranged on the container to determine its location, said communications system being coupled to said positioning system and arranged to transmit to the remote facility the location of the container with the package identifications.

24. The system of claim 18, further comprising:
a sensor that detects opening of a door or port of the container, vibration of the container or sound in the container, the reading of the indicia being controlled based on the detection of the opening of the door or port, vibration of the container or the sound in the container via said sensor.

* * * * *

UNITED STATES PATENT AND TRADEMARK OFFICE
CERTIFICATE OF CORRECTION

| | | |
|---|---|---|
| PATENT NO. | : 8,047,432 B2 | |
| APPLICATION NO. | : 11/877213 | |
| DATED | : November 1, 2011 | |
| INVENTOR(S) | : David S. Breed | |

It is certified that error appears in the above-identified patent and that said Letters Patent is hereby corrected as shown below:

Col. 41, line 37, after "system", delete "further".
Col. 43, line 29, change "lest" to --least--.

Signed and Sealed this
Sixth Day of December, 2011

David J. Kappos
*Director of the United States Patent and Trademark Office*